United States Patent
Fernandez et al.

(10) Patent No.: US 7,612,136 B2
(45) Date of Patent: Nov. 3, 2009

(54) ANIONIC AND OTHER DERIVATIVES OF NON-IONIC SURFACTANTS, METHODS FOR MAKING, AND USES IN EMULSION POLYMERIZATION AND POLYMER DISPERSIONS

(75) Inventors: Ana Maria Fernandez, Chalfont, PA (US); Michael Allen, Greenville, SC (US); Richard Crews, Simpsonville, SC (US)

(73) Assignee: Cognis IP Management GmbH, Duesseldorf (DE)

( * ) Notice: Subject to any disclaimer, the term of this patent is extended or adjusted under 35 U.S.C. 154(b) by 175 days.

(21) Appl. No.: 11/930,300

(22) Filed: Oct. 31, 2007

(65) Prior Publication Data

US 2008/0114104 A1    May 15, 2008

Related U.S. Application Data

(60) Provisional application No. 60/856,638, filed on Nov. 3, 2006.

(51) Int. Cl.
*C08K 5/06* (2006.01)

(52) U.S. Cl. .................. 524/368; 252/182.3

(58) Field of Classification Search ............. 524/368; 252/182.3
See application file for complete search history.

(56) References Cited

U.S. PATENT DOCUMENTS

| | | | | |
|---|---|---|---|---|
| 5,158,692 | A * | 10/1992 | Fabry et al. | ............... 8/111 |
| 5,346,973 | A | 9/1994 | Feustel et al. | |
| 6,653,381 | B2 | 11/2003 | Thames et al. | |
| 6,869,996 | B1 | 3/2005 | Krajnik et al. | |
| 2001/0023265 | A1 | 9/2001 | Hidaka et al. | |
| 2005/0119401 | A1 | 6/2005 | Bavouzet et al. | |
| 2006/0004124 | A1 | 1/2006 | Tsubaki et al. | |

| | | |
|---|---|---|
| 2006/0037512 | A1 | 2/2006 Pawlowska et al. |

FOREIGN PATENT DOCUMENTS

EP    0 684 300 A    * 11/1995

OTHER PUBLICATIONS

Chapters 5, 9 and 10, *Anionic Surfactants*, ed. by H.W. Stache, *Surfactant Science Series*, vol. 56 (1996) (book).
Chapters 5, 9 and 10, *Anionic Surfactants*, ed. by H.W. Stache, *Surfactant Science Series*, vol. 56 (1996).

* cited by examiner

*Primary Examiner*—Peter Szekely

(57) ABSTRACT

An anionic surfactant concentrate and method for making includes providing compound (I) $R^1$—OH where $R^1$ represents a branched $C_{6-22}$ radical with average branching of about 2-8 per radical; providing compound (II):

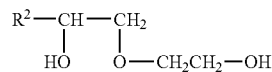

where $R^2$ represents a $C_{8-16}$ radical; mixing (I) and (II); ethoxylating to obtain a reaction product; reacting with a sulfating, phosphating, or sulfitation agent to obtain $R^1$—O—$[CH_2$—$CH_2O]_n$-A and

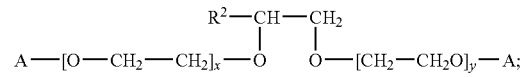

where $R^1$ represents a branched $C_{6-22}$ radical with average branching of about 2-8, $R^2$ represents a $C_{8-16}$ radical, A represents —$SO_3M$, —$PO_3M$, —$PO_3M_2$, —$OCCH_2CH(SO_3Na)COO$—, or $HOOCCH_2CH(SO_3Na)COO$—, M represents a positive counterion, n represents a value from 0-100, and x and y each represents a value from 0-100, where the sum of x and y represents a value of at least 1 to 100 are provided. Anionic surfactant compositions containing the concentrate and methods for stabilizing are also provided.

20 Claims, No Drawings

ANIONIC AND OTHER DERIVATIVES OF NON-IONIC SURFACTANTS, METHODS FOR MAKING, AND USES IN EMULSION POLYMERIZATION AND POLYMER DISPERSIONS

CROSS-REFERENCE TO RELATED APPLICATIONS

This application claims priority under 35 U.S.C. § 119(e) from U.S. Provisional Application No. 60/856,638, filed Nov. 3, 2006, the entire disclosure of which is hereby incorporated herein by reference.

FIELD OF THE INVENTION

The invention relates generally to anionic surfactants and methods for making anionic surfactants, and more particularly to anionic surfactants and methods for making anionic surfactants for emulsion polymerization and polymer dispersions, and as formulating, stabilizing, and dispersing agents.

BACKGROUND INFORMATION

Emulsion polymers obtained by emulsion polymerization of ethylenically unsaturated monomers are used industrially for architectural coatings, adhesives, paper coatings, and textiles. Anionic surfactants or non-ionic surfactants may be used as emulsifiers for emulsion polymerization reactions. The emulsifier may affect the mechanical, chemical, freezing, and storage stability of an emulsion polymer, in addition to affecting, for example, the polymer particle diameter, viscosity, and foaming characteristics. Additionally, the emulsifier may also affect the water, moisture, and heat resistance, and also the adhesiveness of a polymer film formed from the emulsion polymer.

There remains a need for anionic surfactants, anionic surfactant compositions, methods for making anionic surfactants for emulsion polymerization, and for stabilizers for emulsion polymers and polymer dispersions. There also remains a need for anionic
surfactants for post-polymerization stabilization, and also as formulating and dispersing agents.

SUMMARY OF THE INVENTION

Briefly described, according to an aspect of the invention, an anionic surfactant concentrate includes (a) a compound according to general formula (III):

$$R^1\text{—O—}[CH_2\text{—}CH_2O]_n\text{-A} \tag{III}$$

where $R^1$ represents a saturated or unsaturated, branched $C_{6-22}$ radical with an average branching of about 2 to about 8 per radical, A represents —$SO_3M$, —$PO_3M$, —$PO_3M_2$, —$OOCCH_2CH(SO_3Na)COO$—, or $HOOCCH_2CH(SO_3Na)COO$—, M represents a positive counterion, and n represents a value from 0 to about 100; and (b) a compound according to general formula (IV):

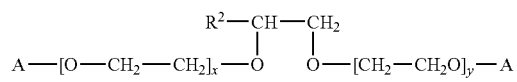

where $R^2$ represents a saturated or unsaturated $C_{8-16}$ radical, A represents —$SO_3M$, —$PO_3M$, —$PO_3M_2$, —$OOCCH_2CH(SO_3Na)COO$—, or $HOOCCH_2CH(SO_3Na)COO$—, M represents a positive counterion, and x and y each represents a value from 0 to about 100, where the sum of x and y represents a value of at least 1 to 100.

According to another aspect of the invention, in another embodiment, a method for making an anionic surfactant concentrate includes the steps of: (a) providing at least one alcohol according to general formula (1):

$$R^1\text{—OH} \tag{I}$$

where $R^1$ represents a saturated or unsaturated, branched $C_{6-22}$ radical with an average branching of about 2 to about 8 per radical; (b) providing at least one diol according to general formula (II):

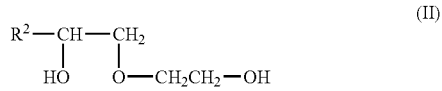

where $R^2$ represents a saturated or unsaturated $C_{8-16}$ radical; (c) combining compound (I) and compound (II) to form a mixture; (d) ethoxylating the mixture to obtain a reaction product; (e) reacting the reaction product with a compound selected from a sulfating agent, a phosphating agent, and a sulfitation agent to obtain a sulfate, a phosphate ester, or a sulfosuccinate compound, respectively, according to general formula (III):

$$R^1\text{—O—}[CH_2\text{—}CH_2O]_n\text{-A} \tag{III}$$

where $R^1$ represents a saturated or unsaturated, branched $C_{6-22}$ radical with an average branching of about 2 to about 8 per radical, A represents —$SO_3M$, —$PO_3M$, —$PO_3M_2$, —$OOCCH_2CH(SO_3Na)COO$—, or $HOOCCH_2CH(SO_3Na)COO$—, M represents a positive counterion, and n represents a value of 0 to about 100;

and a compound according to general formula (IV):

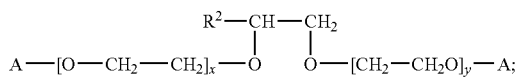

where $R^2$ represents a saturated or unsaturated $C_{8-16}$ radical, A represents —$SO_3M$, —$PO_3M$, —$PO_3M_2$, —$OOCCH_2CH(SO_3Na)COO$—, or $HOOCCH_2CH(SO_3Na)COO$—, M represents a positive counterion, and x and y each represents a value from 0 to about 100, wherein the sum of x and y represents a value of at least 1 to 100; and (f) diluting with water.

According to another aspect of the invention, in another embodiment, a pourable, liquid anionic surfactant composition includes the anionic surfactant concentrate in water.

According to yet another aspect of the invention, a method for stabilizing an emulsion polymer or a polymer dispersion includes the step of adding, to an emulsion polymer or a polymer dispersion, from about 0.3% to about 10% by weight of the anionic surfactant composition or concentrate, based on the total weight of the emulsion polymer or the polymer dispersion.

DETAILED DESCRIPTION OF THE INVENTION

As used herein, the terms "comprises", "comprising", "includes", "including", "has", "having", or any other variation thereof, mean that other elements or components may be included. For example, a process, method, article, or apparatus that comprises a list of elements is not necessarily limited to the expressly listed elements, but may include other elements inherent, or not expressly listed, to such process, method, article, or apparatus. In addition, unless expressly stated to the contrary, the term "or" refers to an inclusive "or" and not to an exclusive "or". For example, the condition A "or" B is satisfied by any one of the following: A is true (included) and B is false (omitted); A is false (omitted) and B is true (included); and both A and B are true (both included).

The terms "a" or "an" as used herein are to describe elements and components of the invention. This is done for convenience to the reader and to provide a general sense of the invention. The use of "a" or "an" should be understood to include one or at least one. In addition, the singular also includes the plural, unless indicated to the contrary. For example, reference to a composition containing "a compound" includes at least one or more compounds.

According to an aspect of the invention, in one embodiment, an anionic surfactant concentrate includes (a) a compound according to general formula (III):

$$R^1-O-[CH_2-CH_2O]_n-A \qquad (III)$$

wherein $R^1$ represents a saturated or unsaturated, branched $C_{6-22}$ hydrocarbon radical attached by carbon with an average branching of about 2 to about 8 per radical, A represents $-SO_3M$, $-PO_3M$, $-PO_3M_2$, $-OOCCH_2CH(SO_3Na)COO-$, or $HOOCCH_2CH(SO_3Na)COO-$, M represents a positive counterion, and wherein n represents a value from 0 to about 100; and (b) a compound according to general formula (IV):

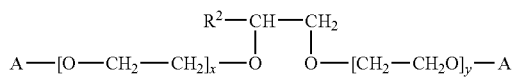

$$A-[O-CH_2-CH_2]_x-O \qquad \overset{R^2-CH-CH_2}{\underset{|\qquad\qquad|}{\phantom{x}}} \qquad O-[CH_2-CH_2O]_y-A \qquad (IV)$$

wherein $R^2$ represents a saturated or unsaturated $C_{8-16}$ radical, A represents $-SO_3M$, $-PO_3M$, $-PO_3M_2$, $-OOCCH_2CH(SO_3Na)COO-$, or $HOOCCH_2CH(SO_3Na)COO-$, M represents a positive counterion, and x and y each represents a value from 0 to about 100, wherein the sum of x an i y represents a value of at least 1 to 100.

In the anionic surfactant concentrate, n may represent a value from 0 to about 75. In the anionic surfactant concentrate, x and y may each represent a value from 0 to about 75, and the sum of x and y may represent a value of at least 1 to about 75. In the anionic surfactant concentrate, R may contain about 6 to about 14 carbon atoms, and/or $R^1$ may predominantly contain 13 carbon atoms. It should be understood that although $R^1$ may predominantly contain 13 carbon atoms, alcohols with different carbon-chain lengths may also be present, including, for example, $C_9$ and $C_{10}$ alcohols (about 2%) and $C_{14}$ alcohols (about 10%). In the anionic surfactant concentrate, $R^1$ may be saturated and have an average branching of about 2 to about 4 per radical, or $R^1$ may be saturated and have an average branching of about 2.5 to about 3.5 per radical. In the anionic surfactant concentrate, M may be derived from the group including, but not limited to, sodium hydroxide, ammonium hydroxide, potassium hydroxide, an alkali including an amine compound, for example, triethanol amine or isopropanolamine, and other metal hydroxides.

In the anionic surfactant concentrate, component (a) may be present in an amount from about 10% to about 99% by weight, and component (b) may be present in an amount from about 1% to about 90% by weight, based on the total weight of the concentrate. Alternatively, component (a) may be present in an amount from about 15% to about 95% by weight, and component (b) may be present in an amount from about 5% to about 85% by weight, based on the total weight of the concentrate. Alternatively, component (a) may be present in an amount from about 20% to about 90% by weight, and component (b) may be present in an amount from about 10% to about 80% by weight, based on the total weight of the concentrate. Alternatively, component (a) may be present in an amount from about 20% to about 80% by weight, and component (b) may be present in an amount from about 20% to about 80% by weight, based on the total weight of the concentrate.

According to another aspect of the invention, in another embodiment, a method for making an anionic surfactant concentrate includes the steps of: (a) providing at least one alcohol according to general formula (1):

$$R^1-OH \qquad (I)$$

wherein $R^1$ represents a saturated or unsaturated, branched $C_{6-22}$ radical with an average branching of about 2 to about 8 per radical; (b) providing at least one diol according to general formula (II):

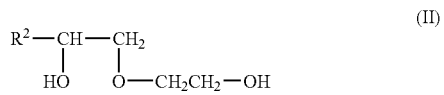

$$\overset{R^2-CH-CH_2}{\underset{|\qquad\qquad|}{\phantom{x}}} \atop HO \qquad O-CH_2CH_2-OH \qquad (II)$$

wherein $R^2$ represents a saturated or unsaturated $C_{8-16}$ radical; (c) combining compound (I) and compound (II) to form a mixture; (d) ethoxylating the mixture to obtain a reaction product comprising a compound according to the formula: $R^1-O-[CH_2-CH_2O]_n-H$, and a compound according to the formula:

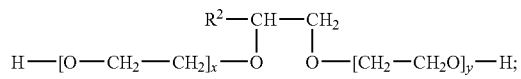

$$H-[O-CH_2-CH_2]_x-O \qquad \overset{R^2-CH-CH_2}{\underset{|\qquad\qquad|}{\phantom{x}}} \qquad O-[CH_2-CH_2O]_y-H;$$

(e) reacting the reaction product with a compound selected from the group consisting of sulfating agents, phosphating agents, and sulfitation agents to obtain a sulfate, a phosphate ester, or a sulfosuccinate compound, respectively, according to general formula (III):

$$R^1-O-[CH_2-CH_2O]_n-A \qquad (III)$$

wherein $R^1$ represents a saturated or unsaturated, branched $C_{6-22}$ radical with an average branching of about 2 to about 8 per radical, A represents $-SO_3M$, $-PO_3M$, $-PO_3M_2$, $-OOCCH_2CH(SO_3Na)COO-$, or $HOOCCH_2CH(SO_3Na)COO-$, M represents a positive counterion, and wherein n represents a value of 0 to about 100; and a compound according to general formula (IV):

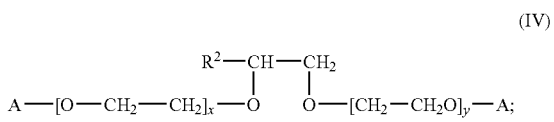

(IV)

wherein $R^2$ represents a saturated or unsaturated $C_{8-16}$ radical, A represents $-SO_3M$, $-PO_3M$, $-PO_3M_2$, $-OOCCH_2CH(SO_3Na)COO-$, or $HOOCCH_2CH(SO_3Na)COO-$, M represents a positive counterion, and x and y each represents a value from 0 to about 100, wherein the sum of x and y represents a value of at least 1 to 100; and (f) diluting with water.

Step (d) may be conducted at a temperature of from about 100° C. to about 180° C., and at a maximum pressure of about 70 psi. An alkali catalyst may be added in step (d).

The method may further include neutralizing sulfates or phosphates according to general formulas (III) and (IV), obtained in step (e), with an alkali source. A suitable alkali includes, for example, sodium hydroxide, ammonium hydroxide, triethanolamine, and isopropanolamine. Sulfosuccinates formed according to an aspect of the invention do not require an additional neutralization step as described below.

The term sulfitation refers to the chemical reaction steps to produce esters of sulfosuccinic acid (sulfosuccinates). The synthesis of sulfosuccinate esters (either mono- or di-esters) is generally carried out in two steps. In the first step, maleic acid anhydride is reacted with a suitable compound bearing hydroxyl functional groups. In the second step, sulfitation of the maleic ester with a sulfitation agent, including sodium sulfite or sodium bisulfite (free of thiosulfite) takes place. Thus, an additional step of neutralizing is unnecessary for forming sulfosuccinates, as the reaction is completed in the second step. The above-described reactions are further described in Chapters 5, 9, and 10 of *Anionic Surfactants*, ed. by Helmut W. Stache, *Surfactant Science Series*, Vol. 56, Marcel Dekker, Inc., NY;, (1996).

The anionic surfactant concentrate, which includes a compound according to general formula (III) and a compound according to general formula (IV), is made by coethoxylation (simultaneous ethoxylation) of a mixture of compounds corresponding to general formulas (I) and (II). A suitable branched alcohol compound according to formula (I) includes, but is not limited to, tridecyl alcohol, octylphenol, nonylphenol, or dodecylphenol. A suitable tridecyl alcohol, sold under the trademark EXXAL®, as EXXAL® 13, is available from ExxonMobil Chemical Company, or is available from Sasol, sold under the trademark SAFOL®, as SAFOL® 23. Other suitable branched alcohols are available fire m ExxonMobil under the trademark EXXAL®. Suitable branched alcohols, including octylphenol, nonylphenol and dodecylphenol, are also available from Schenectady International, Inc., in New York. Suitable branched alcohols according to general formula (I) also include, but are not limited to, branched alcohols available under the trade nark NEODOL®, from Shell Chemical Company in Texas.

At least one of the alcohol compounds according to general formula (I) in the coethoxylation process is branched. Branching may occur at any position on the carbon chain of the alcohol. For example, a suitable average branching ranges between about 2 to about 8 per radical. In another embodiment, the average branching may range between about 2 to about 4, and in another embodiment, the average branching may range between about 2.5 to about 3.5 per radical. It should be understood that a suitable compound according to general formula (I) may include a mixture of one or more branched alcohols with varying amounts of branching per radical.

In addition to at least one branched alcohol according to formula (I), a compound according to general formula (II) is included in the coethoxylation process. Suitable compounds according to general formula (II) include linear, even or odd numbered, primary or secondary, fatty or synthetic alcohols. Suitable compounds according to general formula (II) are commercially readily available, for example, from Cognis Corporation, of Ohio. A suitable secondary alcohol according to general formula (II) includes β-2-hydroxyethoxy alcohol, but is not limited thereto.

Compounds according to general formulas (I) and (II) are mixed, in a suitable vessel, prior to coethoxylation. During ethoxylation, the mixture is subjected to elevated temperatures ranging between about 100° C. to about 180° C. at a maximum pressure of about 70 psi. The process of coethoxylation (simultaneous ethoxylation) is carried out in the presence of suitable catalysts, including sodium hydroxide (NaOH) and potassium hydroxide (KOH). Sodium ethylate and sodium methylate may also be used, but the reaction produces unwanted by-products, including ethanol and methanol.

To obtain the anionic derivatives, the reaction product comprising a compound according to the formula: $R^1-O-[CH_2CH_2-O]_n-H$, and a compound according to the formula;

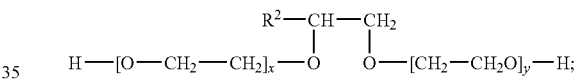

are reacted with a compound selected from the group consisting of sulfating, phosphating, and sulfitation agents to obtain the anionic derivatives according to general formulas (III) and (IV).

A suitable sulfating agent to use in the sulfation reaction includes, but is not limited to chlorosulfonic acid, sulfuric acid, sulfamic acid, and sulfuric anhydride ($SO_3$). A suitable phosphating agent to use in the phosphation reaction includes but is not limited to phosphoric anhydride ($P_4O_{10}$) and polyphosphoric acid. A mixture of mono- and di-esters typically result from the phosphating reaction, but the ratio of the two may be controlled by selecting the appropriate phosphating agent and the reaction conditions. A suitable sulfitation agent to use in the preparation of sulfosuccinic acid derivatives to produce sulfosuccinates (sodium salts of sulfosuccinate mono- or di-esters) includes, but is not limited to, sodium sulfite or sodium bisulfate (free of thiosulfate).

According to another aspect of the invention, in another embodiment, a pourable, liquid, anionic surfactant composition includes the anionic surfactant concentrate in water. A selected quantity of water may be added, under agitation, to the anionic surfactant concentrate, at a temperature ranging from about 25° C. to about 80° C. to form a liquid, anionic surfactant composition. The liquid, anionic surfactant composition may be cooled, and water may be added to replace any water lost during the conversion. The anionic surfactant concentrate may be present in the liquid, anionic surfactant composition in an amount of from about 30% to about 90% by weight water, based on the total weight of the liquid, anionic surfactant composition. The anionic surfactant concentrate may be present in the liquid, anionic surfactant composition in an amount of from about 30% to about 50% by weight water, based on the total weight of the liquid, anionic surfactant composition. The anionic surfactant concentrate may be present in the liquid, anionic surfactant composition in an amount of from about 30% to about 35% by weight, based on the total weight of the liquid, anionic surfactant composition. The liquid, anionic surfactant composition may have a viscosity at 25° C. of less than 2000 cps. The liquid, anionic surfactant composition may have a viscosity at 25° C. of less than 1000 cps.

According to another aspect of the invention, in yet another embodiment, a method for stabilizing an emulsion polymer or a polymer dispersion includes the step of: adding, to an aqueous emulsion polymer or polymer dispersion, from about 0.3% to about 10% by weight of the liquid, anionic surfactant composition, based on the total weight of the emulsion polymer or the polymer dispersion, may be added. Alternatively, from about 0.3% to about 5% by weight of the liquid, anionic surfactant composition, based on the total weight of the emulsion polymer or the polymer dispersion, may be added. Alternatively, from about 0.3% to about 1% by weight of the liquid, anionic surfactant composition, based on the total weight of the emulsion polymer or the polymer dispersion, may be added.

Advantageously, in the emulsion polymerization of ethylenically unsaturated monomers, the anionic surfactant concentrate or the liquid, anionic surfactant composition is added as an additive to carry out the polymerization reaction. In the emulsion polymerization reaction or polymer dispersion, from about 0.3% to about 5% by weight of the liquid, anionic surfactant composition, based on the total weight of the emulsion polymerization reaction or polymer dispersion, may be added to the polymerization reaction. Alternatively, from about 0.3% to about 1.5% by weight of the liquid, anionic surfactant composition, based on the total weight of the emulsion polymerization reaction or polymer dispersion, may be added to the polymerization reaction. Alternatively, from about 0.3% to about 1% by weight of the liquid, anionic surfactant composition, based on the total weight of the emulsion polymerization reaction or polymer dispersion, may be added to the polymerization reaction.

Suitable ethylenically unsaturated monomers include, but are not limited to $C_{1-12}$ alkyl acrylates, including, but not limited to n-butyl acrylate, 2-ethylhexyl acrylate, and mixtures thereof; $C_{1-12}$ alkyl methacrylates including, but not limited to ethyl (meth)acrylate, methyl (meth)acrylate, n-butyl methacrylate, isobutyl methacrylate, t-butyl methacrylate, and mixtures thereof; vinylaromatic compounds including, but not limited to styrene, α-methylstyrene, 3- and 4-vinyltoluene, and mixtures thereof; ethylenically unsaturated carboxylic acids including, but not limited to $C_{3-6}$ α,β-monoethylenically unsaturated mono- and dicarboxylic acids, for example, acrylic acid, methacrylic acid, maleic acid, fumaric acid, itaconic acid, and mixtures thereof; and unsaturated carboxamides, including, but not limited to acrylamide, methacrylamide, 2-acrylamide-2-methylpropanesulfonic acid, N-methylolacrylamide, N-methylolmeth-acrylamide, and mixtures thereof. Other examples of ethylenically unsaturated monomers include aliphatic vinyl esters, for example, vinyl acetate, vinyl propionate, vinyl butyrate and isobutyrate, vinyl valerate, vinyl caproate, and mixtures thereof.

The anionic surfactant concentrates or liquid, anionic surfactant compositions may be used in a variety of waterborne polymer compositions to formulate, stabilize, and disperse emulsion polymers and polymer dispersions, including, for example, household and industrial paints, and household and industrial coatings, including, but not limited to, paper, floor, textile, ink, sealant, and adhesive applications. The anionic surfactants and pourable, liquid, anionic surfactant compositions are also suitable for use in formulations, including paint formulations, for coating metal, wood, and plastic. The anionic surfactant concentrates and liquid, anionic surfactant compositions may also be used in other applications, including for example, home and personal care chemical products, including detergents and cleaning formulations.

Alternatively, the anionic surfactant concentrate or liquid, anionic surfactant composition may be used for post-polymerization stabilization of latex formulations with high filler content, for example, inorganic fillers containing divalent metallic ions, including calcium, magnesium, and zinc that are conventionally used in traffic paints, paper coatings, and architectural coatings.

The anionic surfactant concentrate and surfactant composition may include a biocide to prevent microbial growth, and other components that do not materially affect the basic characteristics and efficacy of the composition.

Unless otherwise defined, all technical and scientific terms used herein have the same meaning commonly understood by one of ordinary skill in the art to which the invention belongs. Although methods and materials similar or equivalent to those described herein can be used in the practice or testing of the invention, suitable methods and materials are described below. The materials, methods and examples are illustrative only, and are not intended to be limiting.

EXAMPLES

Example 1

Production of Anionic Surfactant Mixtures (Concentrates)

Component A, a predominantly $C_{13}$ primary saturated branched alcohol, was mixed with Component B (prepared by the ring-opening of a terminally epoxidized $C_{12}/C_{14}$ alkane mixture (67% by weight $C_{12}$ and approximately 33% by weight $C_{14}$) with equimolar quantities of ethylene glycol based on epoxy content). The mixture of Components A and B was reacted with various molar quantities of ethylene oxide.

Example 2 (Comparative)

Component C, a fatty alcohol mixture containing about 0% to about 2% by weight n-decanol, about 70% to about 75% by weight of lauric alcohol ($C_{12}$), about 24% to about 30% by weight myristic alcohol ($C_{14}$) and about 0% to 2% by weight cetyl alcohol ($C_{16}$) was mixed with component B of Example 1. The mixture of Components B and C was reacted with various molar quantities of ethylene oxide.

Example 3

3.1 Nonylphenol (Component D) was mixed with Component B. The mixture of Components B and D was reacted with various molar quantities of ethylene oxide.
3.2 Octyl phenol (Component E) was mixed with component B. The mixture of Components B and E was reacted with various molar quantities of ethylene oxide.
3.3 A synthetic alcohol mixture containing 67% by weight of a primary $C_{13}$ alcohol and 33% of a $C_{15}$ alcohol (Component F) was mixed with Component B. The mixture of Components B and F was reacted with various molar quantities of ethylene oxide.

Example 4

The non-ionic surfactant mixtures of Examples 1-3 are anionically derivatized to produce sulfates, phosphate esters, or sulfosuccinate esters. The sulfates and phosphate esters thus obtained may be neutralized with suitable alkali compounds.

The invention has been described with reference to specific embodiments. One of ordinary skill in the art, however, appreciates that various modifications and changes can be made without departing from the scope of the invention as set forth in the claims. For example, although the examples used certain branched alcohols, other branched alcohols may be suitable for the anionic surfactant concentrates and liquid, anionic surfactant compositions according to the invention. In addition, although exemplary monomers are described, there is a multitude of monomers, polymer dispersions, and emulsion polymers suitable for use according to an aspect of the invention. Accordingly, the specification is to be regarded in an illustrative manner, rather than with a restrictive view, and all such modifications are intended to be included within the scope of the invention.

Benefits, advantages, and solutions to problems have been described above with regard to specific embodiments. The benefits, advantages, and solutions to problems, and any element(s) that may cause any benefit, advantage, or solution to occur or to become more pronounced are not to be construed as a critical, required, or an essential feature or element of any or all of the claims.

What is claimed is:

1. An anionic surfactant concentrate, comprising:
   (a) a compound according to general formula (III):

$R^1$—O—[$CH_2$—$CH_2$O]$_n$-A  (III)

wherein $R^1$ represents a saturated or unsaturated, branched $C_{6-22}$ radical with an average branching of about 2 to about 8 per radical, A represents —$SO_3M$, —$PO_3M$, —$PO_3M_2$, —OOCCH$_2$CH(SO$_3$Na)COO—, or HOOCCH$_2$CH(SO$_3$Na)COO—, M represents a positive counterion, and n represents a value from 0 to about 100; and
   (b) a compound according to general formula (IV):

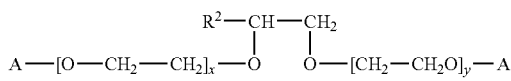

(IV)

wherein $R^2$ represents a saturated or unsaturated $C_{8-16}$ radical, each A represents —$SO_3M$, —$PO_3M$, —$PO_3M_2$, —OOCCH$_2$CH(SO$_3$Na)COO—, or HOOCCH$_2$CH(SO$_3$Na)COO—, M represents a positive counterion, and x and y each represent a value from 0 to about 100, wherein the sum of x and y represents a value of at least 1 to 100.

2. The anionic surfactant concentrate according to claim 1, wherein n represents a value from 0 to about 75.

3. The anionic surfactant concentrate according to claim 1, wherein x and y each represents a value from 0 to about 75, and the sum of x and y represents a value of at least 1 to 75.

4. The anionic surfactant concentrate according to claim 1, wherein $R^2$ contains about 6 to about 14 carbon atoms.

5. The anionic surfactant concentrate according to claim 1, wherein $R^1$ predominantly contains 13 carbon atoms.

6. The anionic surfactant concentrate according to claim 1, wherein $R^1$ is saturated and has an average branching of about 2 to about 4 per radical.

7. The anionic surfactant concentrate according to claim 1, wherein M is derived from the group consisting of: sodium hydroxide, ammonium hydroxide, potassium hydroxide, triethanolamine, isopropanolamine, and metal hydroxides.

8. The anionic surfactant concentrate according to claim 1, wherein component (a) is present in an amount from about 99% to about 10% by weight, and component (b) is present in an amount from about 1% to about 90% by weight.

9. The anionic surfactant concentrate according to claim 1, wherein the anionic surfactant concentrate is added to an emulsion polymer or a polymer dispersion as an additive in the emulsion polymerization of ethylenically unsaturated monomers to carry out the polymerization reaction.

10. A method for making an anionic surfactant concentrate, comprising the steps of:
   (a) providing at least one alcohol according to the general formula (1):

$R^1$—OH  (I)

wherein $R^1$ represents a saturated or unsaturated, branched $C_{6-22}$ radical with an average branching of about 2 to about 8 per radical;
   (b) providing at least one diol according to the general formula (II):

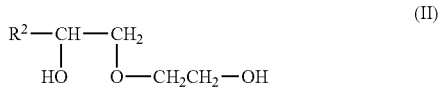

(II)

wherein $R^2$ represents a saturated or unsaturated $C_{8-16}$ radical;
   (c) combining compound (a) and compound (b) to form a mixture;
   (d) ethoxylating the mixture to obtain a reaction product;
   (e) reacting the reaction product with a compound selected from the group consisting of sulfating agents, phosphating agents, and sulfitation agents to obtain a sulfate, a phosphate ester, or a sulfosuccinate compound, respectively, according to general formula (III):

$R^1$—O—[$CH_2$—$CH_2$O]$_n$-A  (III)

wherein $R^1$ represents a saturated or unsaturated, branched $C_{6-22}$ radical with an average branching of about 2 to about 8 per radical, A represents —$SO_3M$, —$PO_3M$, —$PO_3M_2$, —OOCCH$_2$CH(SO$_3$Na)COO—, or HOOCCH$_2$CH(SO$_3$Na)COO—, M represents a positive counterion, and n represents a value from 0 to about 100; and a compound according to general formula (IV):

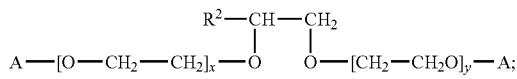

(IV)

wherein $R^2$ represents a saturated or unsaturated $C_{8-16}$ radical, A represents —$SO_3M$, —$PO_3M$, —$PO_3M_2$, —OOCCH$_2$CH(SO$_3$Na)COO—, or HOOCCH$_2$CH(SO$_3$Na)COO—, M represents a positive counterion, and x and y each represents a value from 0 to about 100, wherein the sum of x and y represents a value of at least 1 to 100; and
   (f) diluting with water.

11. The method according to claim 10, further comprising the step of neutralizing the sulfates or phosphate esters obtained in step (e) with an alkali source.

12. The method according to claim 11, wherein the alkali source is selected from the group consisting of: sodium hydroxide, ammonium hydroxide, triethanolamine, and isopropanolamine, and metal hydroxides.

13. The method according to claim 10, wherein step (d) further comprises conducting at a temperature of from about 100° C. to about 180° C., and at a maximum pressure of about 70 psi.

14. The method according to claim 10, wherein step (d) further comprises adding an alkali catalyst.

15. The anionic surfactant concentrate according to claim 1, to which water is added to form a liquid, anionic surfactant composition.

16. The liquid, anionic surfactant composition according to claim 15, wherein the concentrate is present in an amount of from about 30% to about 90% by weight, based on the total weight of the liquid anionic surfactant composition.

17. The liquid, anionic surfactant composition according to claim 15, wherein the viscosity at 25° C. is less than 2000 cps.

18. The liquid, anionic surfactant composition according to claim 15, wherein the viscosity at 25° C. is less than 1000 cps.

19. The liquid, anionic surfactant composition according to claim 15, wherein the liquid, anionic surfactant composition is added to an emulsion polymer or a polymer dispersion as an additive in the emulsion polymerization of ethylenically unsaturated monomers to carry out the polymerization reaction.

20. A method for stabilizing an emulsion polymer or a polymer dispersion, comprising the step of:
adding, to an emulsion polymer or polymer dispersion, from about 0.3% to about 10% by weight of a liquid anionic surfactant composition, based on the total weight of the emulsion polymer or polymer dispersion, comprising:

(a) a compound according to general formula (III):

wherein $R^1$ represents a saturated or unsaturated, branched $C_{6-22}$ radical with an average branching of about 2 to about 8 per radical, A represents —$SO_3M$, —$PO_3M$, —$PO_3M_2$, —$OOCCH_2CH(SO_3Na)COO$—, or $HOOCCH_2CH(SO_3Na)COO$—, M represents a positive counterion, and n represents a value from 0 to about 100;

(b) a compound according to general formula (IV):

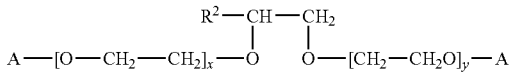

wherein $R^2$ represents a saturated or unsaturated $C_{8-16}$ radical, each A represents —$SO_3M$, —$PO_3M$, —$PO_3M_2$, —$OOCCH_2CH(SO_3Na)COO$—, or $HOOCCH_2CH(SO_3Na)COO$—, M represents a positive counterion, and x and y each represent a value from 0 to about 100, wherein the sum of x and y represents a value of at least 1 to 100; and (c) water.

* * * * *